United States Patent
Rey-Fabret et al.

(10) Patent No.: US 6,823,296 B2
(45) Date of Patent: Nov. 23, 2004

(54) METHOD FOR FORMING AN OPTIMIZED NEURAL NETWORK MODULE INTENDED TO SIMULATE THE FLOW MODE OF A MULTIPHASE FLUID STREAM

(75) Inventors: Isabelle Rey-Fabret, Versailles (FR); Emmanuel Duret, Rueil Malmaison (FR); Eric Heintze, Meudon (FR); Véronique Henriot, Rueil Malmaison (FR)

(73) Assignee: Institut Francais du Petrole, Rueil-Malmaison cedex (FR)

(*) Notice: Subject to any disclaimer, the term of this patent is extended or adjusted under 35 U.S.C. 154(b) by 366 days.

(21) Appl. No.: 10/024,719

(22) Filed: Dec. 21, 2001

(65) Prior Publication Data

US 2002/0082815 A1 Jun. 27, 2002

(30) Foreign Application Priority Data

Dec. 22, 2000 (FR) .......................... 00 16878

(51) Int. Cl.$^7$ ............................. G06F 17/50; G06G 7/48
(52) U.S. Cl. ............................................... 703/2; 703/5
(58) Field of Search ....................... 703/2, 5, 9; 706/16, 706/17, 25; 382/157

(56) References Cited

U.S. PATENT DOCUMENTS

| | | | | |
|---|---|---|---|---|
| 4,874,963 A | * | 10/1989 | Alspector | 706/34 |
| 5,619,433 A | | 4/1997 | Wang et al. | 364/578 |
| 5,649,064 A | * | 7/1997 | Jorgensen et al. | 706/17 |
| 5,924,086 A | * | 7/1999 | Mathur et al. | 706/25 |
| 6,047,221 A | | 4/2000 | Piche et al. | 700/44 |
| 6,243,696 B1 | * | 6/2001 | Keeler et al. | 706/21 |
| 6,411,944 B1 | * | 6/2002 | Ulyanov | 706/13 |

OTHER PUBLICATIONS

Bishop et al., "Analysis of multiphase flows using dual–energy gamma densitometry and neural networks", *Nuclear Instruments and Methods in Physics Research* A327 (1993) 580–593.

* cited by examiner

*Primary Examiner*—Thai Phan
(74) *Attorney, Agent, or Firm*—Antonelli, Terry, Stout & Kraus, LLP

(57) ABSTRACT

A method for forming a module (hydrodynamic or thermodynamic for example) intended for real-time simulation of the flow mode, at any point of a pipe, of a multiphase fluid stream comprising at least a liquid phase and at least a gas phase. The method comprises using a modelling system based on non-linear neural networks each having inputs for structure parameters and physical quantities, outputs where quantities necessary for estimation of the flow mode are available, and at least one intermediate layer. The neural networks are determined iteratively to adjust to the values of a learning base with predetermined tables connecting various values obtained for the output data to the corresponding values of the input data. A learning base suited to the imposed operating conditions is used and optimized neural networks best adjusted to the imposed operating conditions are generated.

4 Claims, 1 Drawing Sheet

Output layer - 2 neurons

Input layer - 1 neurons

Hidden layer - Nc neurons

|  | ESTIMATION | | | |
|---|---|---|---|---|
| DATA | C1={β=0} | C2={0<β<1} | C3={β=1} |  |
| C1={β=0} | 87.3% | 10.7% | 2% | 100 % |
| C2={0<β<1} | 3.1% | 81.5% | 15.4% | 100 % |
| C3={β=1} | 0.2% | 4.8% | 95% | 100 % |

|  | ESTIMATION | | | |
|---|---|---|---|---|
| DATA | C1={β=0} | C2={0<β<1} | C3={β=1} |  |
| C1={β=0} | 99.49% | 0.5% | 0.01% | 100 % |
| C2={0<β<1} | 1% | 98.3% | 0.7% | 100 % |
| C3={β=1} | 0.05% | 2.9% | 97% | 100 % |

METHOD FOR FORMING AN OPTIMIZED NEURAL NETWORK MODULE INTENDED TO SIMULATE THE FLOW MODE OF A MULTIPHASE FLUID STREAM

BACKGROUND OF THE INVENTION

1. Field of the Invention

The present invention relates to a method for forming a neural network module for real-time simulation of the flow mode, at any point of a pipe, of a multiphase fluid stream comprising at least a liquid phase and at least a gas phase, that is best suited to operating conditions and to a set of fixed physical quantities.

2. Description of the Prior Art

Transporting hydrocarbons from production sites to treating plants constitutes an important link in the petroleum chain. It is a delicate link because of the complex interactions between the phases forming the transported effluents. The basic objective for operators is to reach an optimum productivity under the best safety conditions. They therefore have to control as best they can the velocity and the temperature of the transported hydrocarbons so as to avoid unnecessary pressure drops, unwanted deposits and unsteady-state flows. The method that is generally used models in the best possible way the transportation of complex multiphase streams so as to provide at all times an image of the flows in the various parts of the production chain, taking into account the precise constitution of the effluent, the flow rates, the pressures and the flow modes.

There are currently various software modules for simulating the transport of complex multiphase streams, allowing to design suitable production equipments at an early stage.

U.S. Pat. Nos. 5,550,761, 6,028,992 and 5,960,187 filed by the applicant notably describe modelling modules forming the TACITE model known in the art, allowing to simulate the transport of complex multiphase streams as a steady or transient flow and accounting for instability phenomena that occur because of the irregular geometry of the formation crossed by the pipe or of the topography thereof, referred to by specialists as "terrain slugging" or "severe slugging".

The simulation modules are as complex as the modelled phenomena. Precision and performance can only be obtained after a relatively long modelling time, which is not really compatible with real-time management. That is the reason why the modelling modules cannot be used as they are for real-time management of the production. It therefore appears necessary to use modelling methods offering a good compromise between calculating speed and accuracy of results.

French Patent application 00/09,889 filed by the applicant describes a method of real-time estimation of the flow mode, at any point of a pipe having a structure that can be defined by a certain number of structure parameters, of a multiphase fluid stream defined by several physical quantities and comprising liquid and gas phases. According to this method, the flow mode is modelled:

by forming a non-linear neural network with an input layer having as many inputs as there are structure parameters and physical quantities necessary for good estimation of the output, an output layer with as many outputs as there are quantities necessary for estimation of the flow mode, and at least one intermediate layer, by forming a learning base with predetermined tables connecting various values obtained for the output data to the corresponding values of the input data, and by determining, by iterations, weighting factors of the activation function allowing to properly connect the values in the input and output data tables.

Output data of the neural network is preferably analysed so as to sort, among the values of the output data of the neural network, only the pertinent data to be taken into account for iterative determination of the weighting coefficients of the activation function.

SUMMARY OF THE INVENTION

The method according to the invention forms a module (hydrodynamic or thermodynamic for example) intended for real-time simulation of the flow mode, at any point of a pipe, of a multiphase fluid stream comprising at least a liquid phase and at least a gas phase, that is best suited to fixed operating conditions concerning a certain number of determined structure and physical parameters relative to the pipe, and a set of determined physical quantities (hydrodynamic or thermodynamic quantities for example), with fixed variation ranges for the parameters and the physical quantities.

The method of the invention comprises using a modelling system based on non-linear neural networks each having inputs for structure parameters and physical quantities, outputs where quantities necessary for estimation of the flow mode are available, and at least one intermediate layer. The neural networks are determined iteratively so as to adjust to the values of a learning base with predetermined tables connecting various values obtained for the output data to the corresponding values of the input data.

The method is forms a learning base suited to the imposed operating conditions and optimized neural networks best adjusted to the imposed operating conditions are generated.

In the case, for example, where the module is to be integrated in a general multiphase flow simulation model, both hydrodynamic and thermodynamic, the model is used to form the learning base so as to select the set of physical quantities that is best suited to the model, as well as the variation ranges fixed for the parameters and the physical quantities, and the optimized neural networks that best adjust to the learning base formed are generated.

DETAILED DESCRIPTION OF THE PREFERRED EMBODIMENTS OF THE INVENTION

Figures 1, 2, 3:
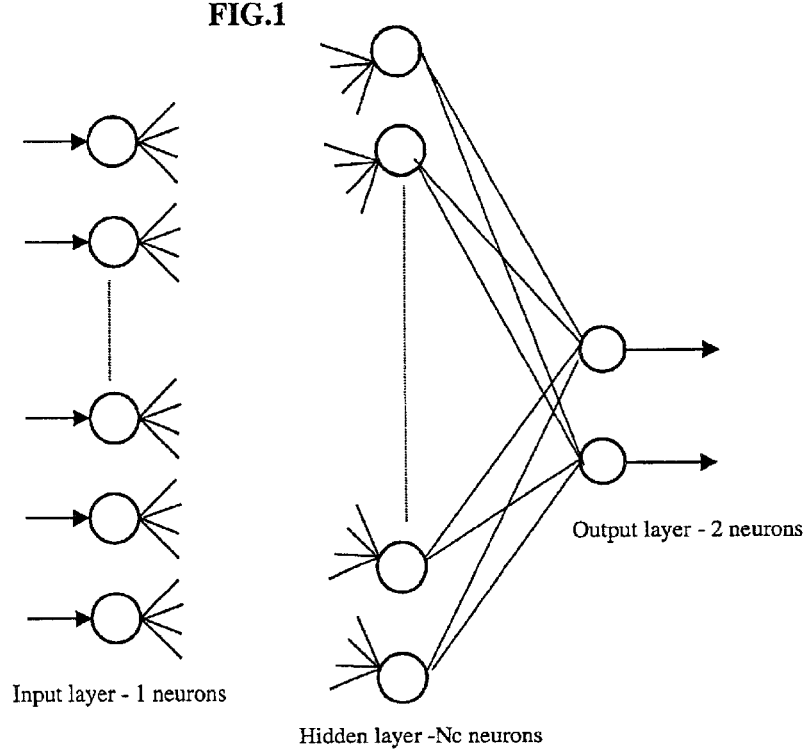
FIG. 1 illustrates a neural network in accordance with the invention.
FIG. 2 is a table expressing classification percentage obtained for three output classes of the neural network of FIG. 1.
FIG. 3 is a table illustrating classification results.

General Points Concerning the Formation of the Neural Networks System

A circulation of multiphase fluids in a pipe with at least a liquid phase and at least a gas phase is considered in formation of a neural system providing, from a certain number of geometrical and physical input data relative to the pipe and of physical data relative to the fluids, instantaneously, for each section of the fluid stream, an estimation of the flow mode or, from a certain number of data linked with the pressure and temperature conditions of the fluid, and with the composition of the fluid, giving the thermodynamic behaviour of the fluid. The whole of this input data constitutes a database.

1) Input and Output Data

The input data is for example:
- geometrical and physical data of the pipes: diameter, roughness and angle of inclination of the pipe, and thermodynamic data: density of the gas, density of the liquid, viscosity of the gas, viscosity of the liquid, etc.; the whole of this data constitutes an n-uplet, and
- hydrodynamic data characterizing the mixture: gas/liquid surface tension, volume fraction of gas, barycentric velocity of the mixture, etc.,
- thermodynamic data relative to the environment of the fluid: pressure, temperature, the whole of this data constituting an n-uplet, as well as data characterizing the composition of the mixture: molar mass, critical properties, enthalpy coefficients, etc.

The model produces for example at the output the hydrodynamic behaviour of the effluents, and notably the flow regime. It evaluates and delivers at two main outputs hydrodynamic data in the part of the pipe where the flow type is to be determined, the velocity difference dV between gas and liquid for example, or the stratified type flow fraction $\beta(\beta \in [0;1])$ (type where the liquid phase flows in the lower part of the pipe). Other quantities qualifying the flow type can be calculated from these two outputs.

In applications to thermodynamics, the model produces at the output the thermodynamic quantities of the effluents such as, for example, the number and the nature of the phases in presence or the molar fractions of the phases.

2) Structure of the System of Networks

The function to be modelled by the hydrodynamic or thermodynamic model involves various subfunctions that can be solved by using, if necessary, several networks playing a well-determined part within the model For example, a network can be dedicated to the non-linear function regression, while another network is dedicated to the classification of the various flow regimes. Besides, the connections to be established between the networks or between the module and its outer environment can require complementary data processing (data normalization, denormalization, etc.). The system is therefore referred to as based on neural networks.

In order to connect the whole of the hydrodynamic or thermodynamic input and output data, a system of neural networks is formed, these networks being preferably of MLP type, well-known in the art since it is particularly well-suited for physical phenomena modelling. Its structure allows to describe the dynamic as well as the static components of the phenomena, even by fixing, if necessary, some of its parameters at a reified value, therefore physically representative. Thus, knowing physical equations that govern the flows allows, for example, enrichment of the network and to best adaption thereof to the physical phenomena modelled thereby.

The neural network comprises (FIG. 1) three layers for example: the input layer of ten neurons corresponding to the ten data (mentioned above) of the complete physical model, an output layer of two neurons corresponding to the two parameters dV and $\beta$ sought, and an intermediate layer, referred to as hidden layer, whose number of neurons $N_c$ is optimized. The network is totally connected. The non-linearity of this network is obtained by a sigmoid activation function governing the behaviour of the neurons in the hidden layer. The neurons of the output layer can be selected linear or non-linear. The activation function can be the identity function for example.

3) Learning

The weights of this structure are determined at the end of a learning stage; during this stage, the network is supplied with a set of data forming the learning base of the network, and the structure and the weights of the network are optimized by minimizing the errors observed for all the samples of the base, between the output data resulting from network calculations and the data expected at the output, given by the base. The errors can be the absolute errors between the input and output quantities or the relative errors, according to the performance desired for the network.

The generalization powers of the network are then tested from its capacity to properly calculate the two outputs for inputs that are unknown thereto.

Implementation Particularities

The system based on neural networks modelling the hydrodynamic module or the thermodynamic module is defined by a set of parameters for which the learning base allows to determine and fixing thereof. These parameters are adaptable to the constraints imposed by the use to which this module is dedicated.

If the module is intended for a general use, the learning base has to be exhaustive, i.e. include all the available data concerning the various inputs/outputs; the module can thus represent all of the cases that can be encountered in the field.

If the module is used in a more specialized framework or context, production of an oil field for example, adjustment is carried out on a more restricted learning base containing only the data that can be encountered in this field alone: type or structure of the pipes or pipelines, topographic variations, more restricted ranges of variation of certain hydrodynamic or thermodynamic quantities, etc. The parameters of the neural networks are in this case calculated so as to obtain a product specific to a given configuration, in order to represent in the best possible way the flows in operating ranges specific to this field.

This module is thus adaptable to the various objectives fixing the use thereof.

Environment of the Neural Network Module

The module developed can be used alone, without associated modules. In this case, the module is adjusted to databases formed according to the desired use, according to whether the context is general or specific. It is independent and allows estimation of the hydrodynamic or thermodynamic quantities likely for monitoring of the behaviour of effluent flows in pipelines, from a learning base containing physical and thermodynamic quantities data provided otherwise.

The module can also be implemented in any model (set of simulation software modules capable of simulating the transient and/or steady behaviour of multiphase flows, such as for example the TACITE model mentioned above). In this case, the module is adjusted to reference models representing the current state of the art, and to associated databases that widely cover the whole of the definition domain of the n-uplet formed by the input data. This adjustment thus takes into account the specificities of the software environment in which it is included.

To form the learning base that is best suited to the model where the neural system is to be integrated, the model is advantageously used to connect the input and output data.

EXAMPLES OF USE

The module based on neural networks is suited for any application requiring hydrodynamic representation of effluents: formation of flow predictive simulation codes, real-time simulation or training simulation, etc. Active production control methods can also be based on such a module.

OPTIMIZATION EXAMPLES

Consider for example the case where a network giving the classification of the flow type of multiphase fluids is to be optimized: stratified type or class C1 flow (defined above), intermittent type or class C2 flow (characterized by a succession of liquid and gaseous slugs), or dispersed type or class C3 flow (the liquid being carried along in form of fine droplets), according to inputs as described above under the heading "General Points Concerning the Formation of the Network".

A neural network is first formed by means of a general base. The resulting optimum structure obtained contains 30 neurons, with a single hidden layer. The network table obtained (FIG. 2) expresses the classification percentage obtained in the three output classes of the network for each class of the database.

The database used is then restricted to particular configurations, which reduce the ranges of variation of the various inputs of the network. The optimum neural network consists in this case of 28 neurons and comprises a single hidden layer. The classification result is shown by the confusion table in FIG. 3.

It can immediately be seen that the good classification results distributed over the diagonal are greatly improved in relation to the previous case, formed by means of a less selective base, less suited to the configuration to which the module is applied.

Adjustment of the database to the conditions of use thus allows, on the one hand, modification of the structure of the network and, on the other hand, to optimize the generalization results obtained.

We claim:

1. A method for forming a module providing for real-time simulation of the flow mode, at any point of a pipe, of a multiphase fluid stream comprising at least a liquid phase and at least a gas phase, for imposed operating conditions concerning determined structural parameters relative to the pipe, and a set of determined physical quantities, with fixed variation ranges for the parameters and said physical quantities, by a modelling system based on non-linear neural networks each having inputs for structure parameters and the physical quantities, outputs where quantities necessary for estimation of the flow mode are available, and at least one intermediate layer, comprising determining the non-linear neural networks so as to adjust to values of a learning base with predetermined tables connecting values obtained for the output data from the output to corresponding values of input data to the inputs and wherein the learning base is suited to the imposed operating conditions and the determined non-linear neural networks are adjusting to the imposed operating conditions.

2. A method as claimed in claim 1, wherein the physical quantities are hydrodynamic quantities.

3. A method as claimed in claim 1, wherein the physical quantities are thermodynamic quantities.

4. A method as claimed in claim 2, wherein the module being integrated is a hydrodynamic and thermodynamic multiphase flow simulation model, the model being used to form the learning base to select the physical quantities best suited to the model, variation ranges fixed for the parameters and the physical quantities, and an optimized neural networks best suited to the learning base.

* * * * *